April 20, 1937. C. A. TURNER 2,078,043
FLOW INDICATING APPARATUS
Filed Jan. 15, 1931 4 Sheets-Sheet 1
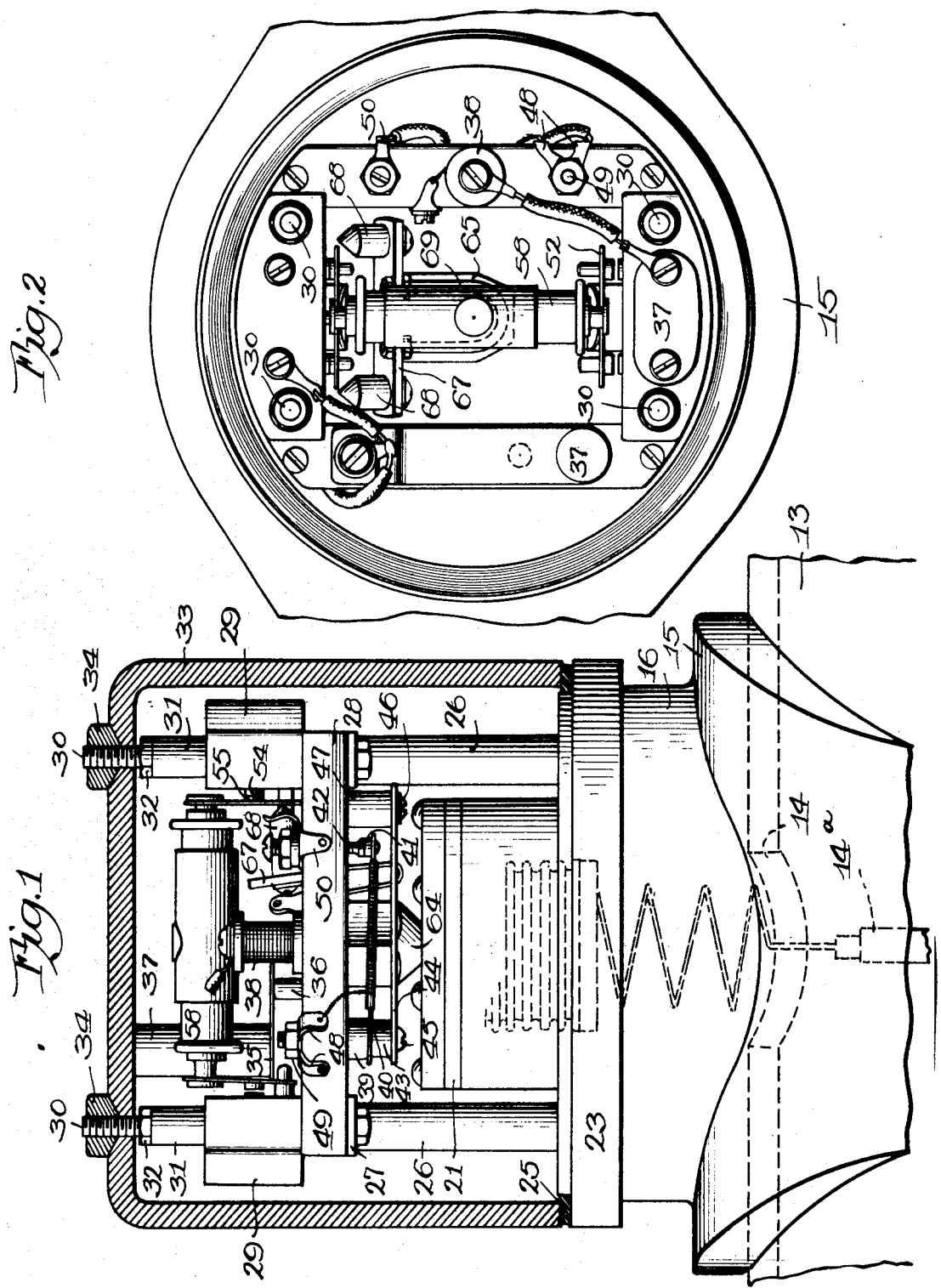
Witness:
Inventor,
Charles A. Turner, April 20, 1937. C. A. TURNER 2,078,043
FLOW INDICATING APPARATUS
Filed Jan. 15, 1931 4 Sheets-Sheet 2
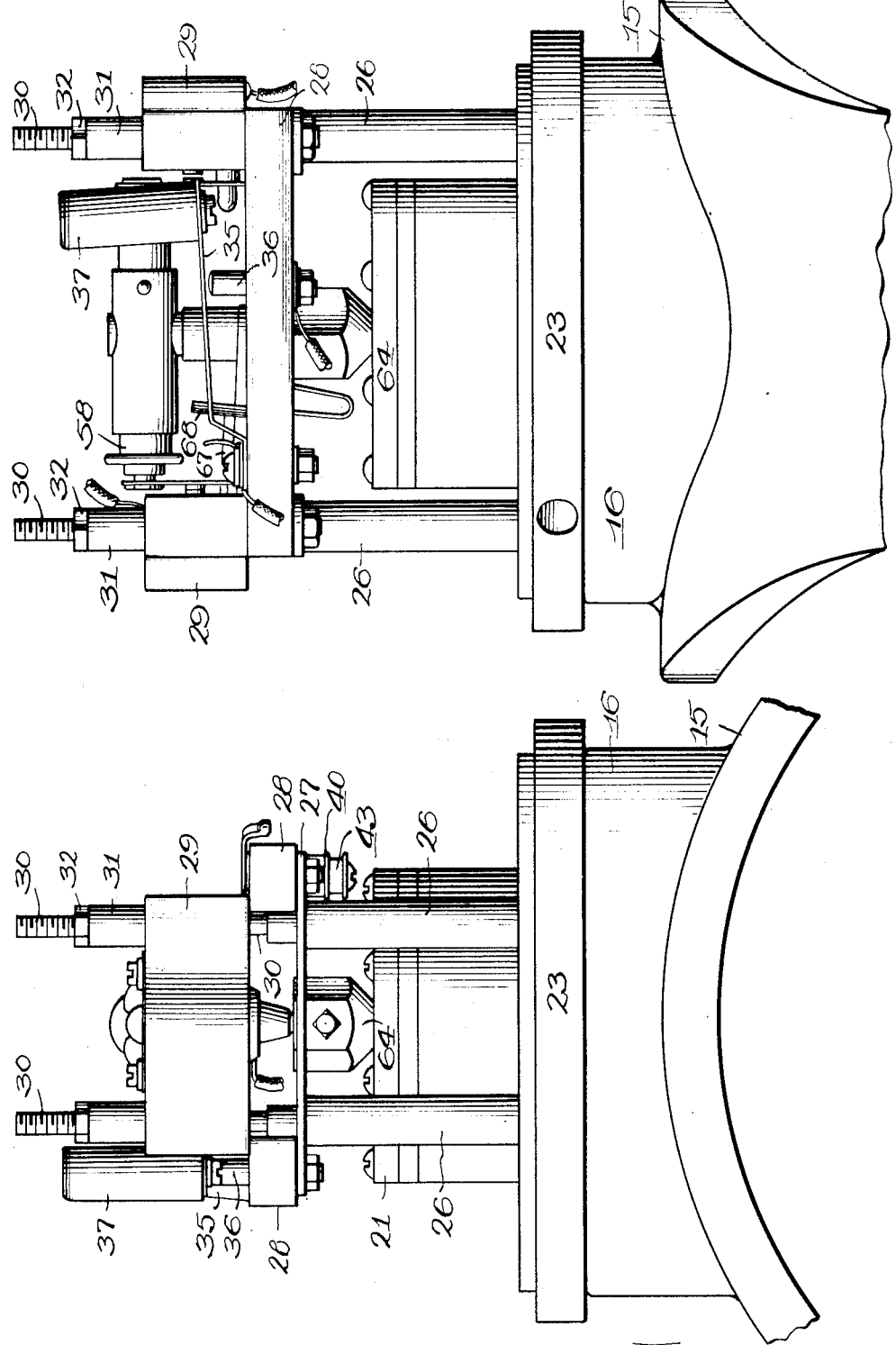
Inventor
Charles A. Turner, April 20, 1937. C. A. TURNER 2,078,043
FLOW INDICATING APPARATUS
Filed Jan. 15, 1931 4 Sheets-Sheet 3
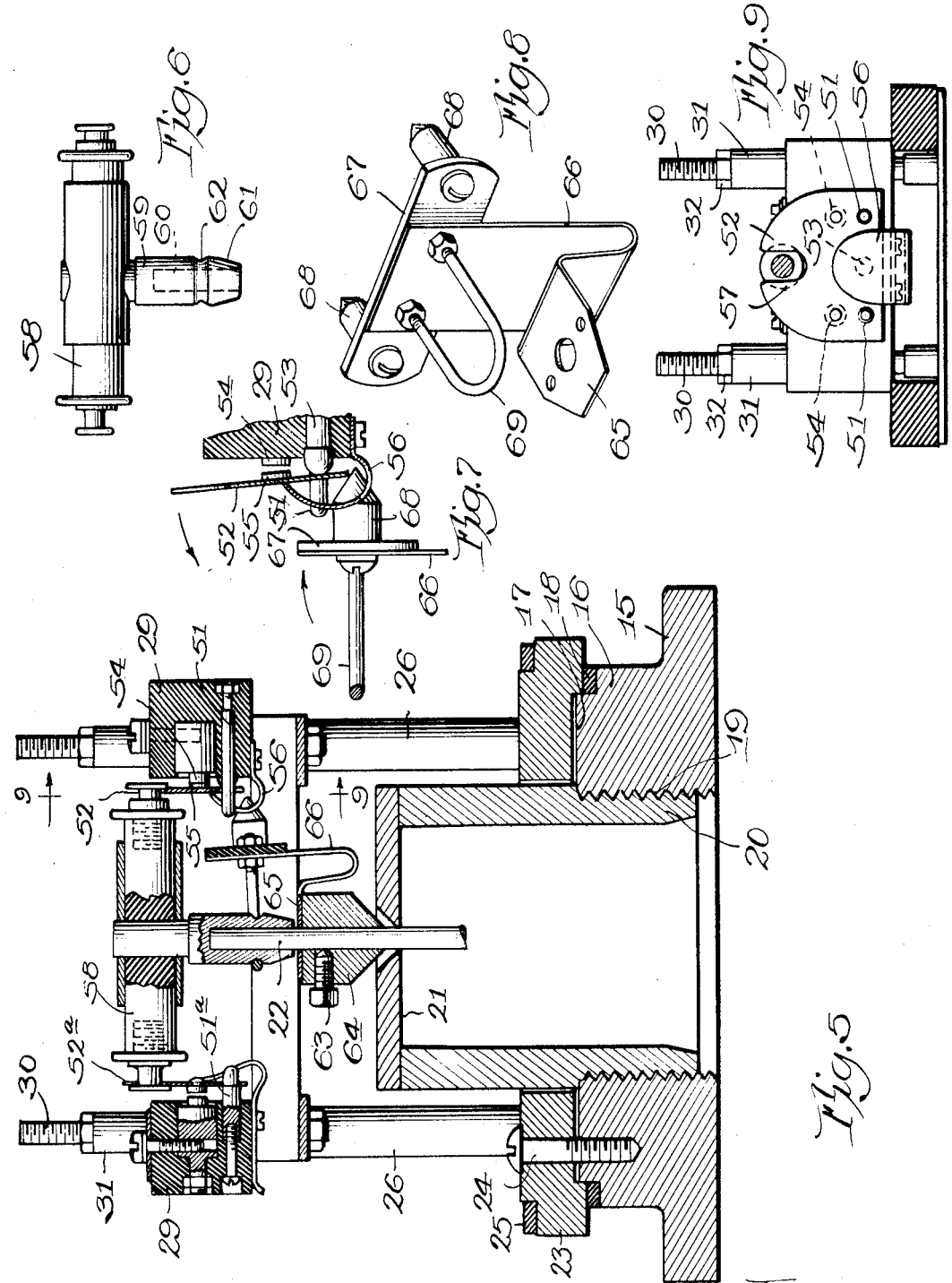
Inventor,
Charles A. Turner, Inventor,
Charles A. Turner, Witness:

Patented Apr. 20, 1937

2,078,043

UNITED STATES PATENT OFFICE 2,078,043

FLOW INDICATING APPARATUS

Charles A. Turner, Chicago, Ill., assignor, by mesne assignments, to Howe Manufacturing Company, Wilmington, Del., a corporation of Delaware Application January 15, 1931, Serial No. 508,839

3 Claims. (Cl. 177—382)

My present invention relates to improvements in flow indicating apparatus or apparatus for indicating a flow of water or other liquid in a system of piping for the storage and conduction of the liquid. Liquids, and especially water, are peculiarly mobile and subject to surgings and vibrations which are quite as likely to actuate apparatus designed for indicating the movement of liquid as a flow created by discharge from some portion of the system, and the practical problem is to provide instrumentalities which will react to a flow and will not react to the surges and vibrations to which the liquid in a particular system is subject. Surges and vibrations are oscillatory or reverberatory in character and develop impulsive force in a particular direction for relatively brief periods of time, whereas a flow which is not stopped immediately and ceases to be a flow has a continuous impulsive force in the direction of flow while the flow lasts or for a considerable longer period of time than the surges and vibrations.

I have utilized this difference in duration between surges and vibrations upon the one hand and flow upon the other in the construction of a flow indicating device for which I filed application for Letters Patent on the 23rd day of July, 1928, which said application has been assigned Serial No. 294,653.

In the aforementioned application, now abandoned, I so mounted a blade in the liquid, together with instrumentalities for transmitting the movement of the blade to the signalling apparatus whereby the blade was required to be deflected for a certain interval of time before the signal apparatus would be actuated.

In my present application I have provided instrumentalities in the electrical apparatus whereby it is necessary that it shall be actuated continuously for a predetermined length of time before a signal will be transmitted.

Flow indicating apparatus are associated with fire extinguishing sprinkler systems which, in turn, involve both municipal and insurance regulation and supervision, whereby a condition has been created in which a flow indicator to be of any practical value must be constructed so that it cannot be rendered inoperative or tampered with without giving an alarm as positively as when it functions to indicate a flow.

I have therefore provided in connection with instrumentalities for indicating a flow means organized therewith for indicating any tampering with the apparatus and other means also organized with the flow indicating mechanism for signalling in the event that complete assembly is not restored after inspection.

I have attained the foregoing objects and results by means of the apparatus illustrated in the accompanying drawings in which—

Fig. 1 is a side elevation of an embodiment of my invention, the cover thereof being in central section.

Fig. 2 is a plan of the structure shown in Fig. 1 with the cover removed.

Fig. 3 is an end elevation of the structure shown in Figs. 1 and 2.

Fig. 4 is a side elevation without the cover of the side opposite to that shown in Fig. 1.

Fig. 5 is a central longitudinal section.

Fig. 6 is an elevation of the actuating member for and linkage between the opposed switch blades.

Fig. 7 is a detail showing the series switch blade in open position in the absence of the linkage between the blades.

Fig. 8 is a perspective detail of the spring for opening the series switch blade when the linkage between the switch blades is removed.

Fig. 9 is a view on section line 9—9 of Fig. 5 comprising an elevation of the series switch blade.

Similar reference characters refer to similar parts throughout the respective views.

Figure 10:
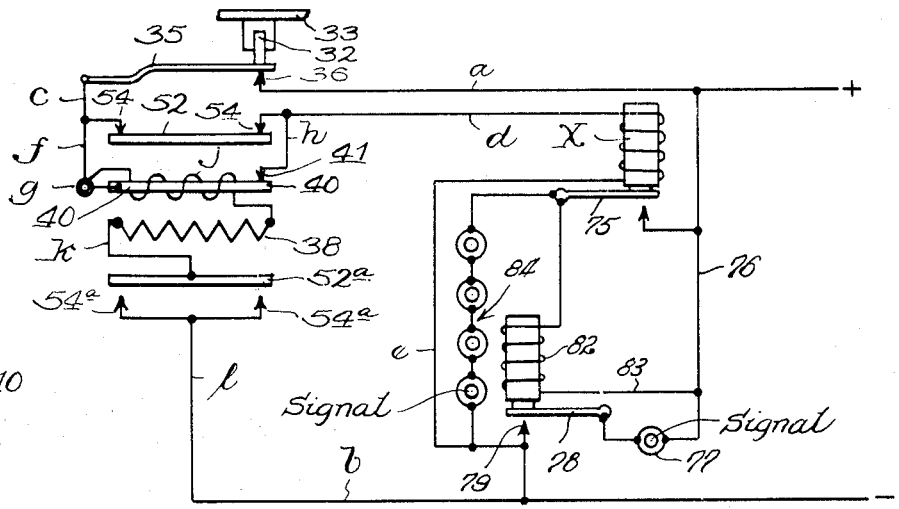
Figs. 10, 11, and 12 are diagrams of the different and progressive electrical phases which the apparatus takes in transmitting a signal.

The pipe, 13, either riser or lateral, is perforated, at 14, and opposite the perforation is mounted, in any desired manner, the saddle 15, shown in Figs. 1, 3, 4, and 5. The saddle 15 is provided with a central embossment 16, which, as shown in Fig. 5, is provided with a flattened top 17 with an annular peripheral channel to receive a sealing gasket 18. The embossment 16 and saddle 15 are centrally bored and tapped, as at 19, preferably on a taper to receive the oppositively threaded cylindrical casing 20 which contains the mounting for the blade 14a, which is extended into the liquid contained in the pipe to which the apparatus is affixed. The upper end of the casing 20 is covered by a cap 21 centrally perforated to permit of the passage therethrough of a stem or rod 22 moved by the blade when the liquid in the pipe moves.

So far as the present invention is concerned the mounting of the blade and its association with the stem 22 is not important, such mounting may be as shown in my heretofore referred to application for United States Letters Patent Serial No. 294,653.

Seating upon the top 17 of the embossment 16 of the saddle 15, and around the casing 20, is a collar 23. Collar 23 is secured to the embossment 16 by screws 24 and is provided on its upper face with a peripheral groove to receive a packing gasket 25. Arising from the top of the collar 23 are four rectangularly disposed columns or pillars 26. Running across and supported upon the columns 26 at the ends of the rectangular arrangement of columns are plates 27 to the outer ends of which are secured sills of suitable insulating material 28. Resting upon the sills 28 and extending therebetween are end blocks 29 also made of insulating material. Extending upwardly from the columns or pillars 26 through the plates 27 and end blocks 29 are threaded rods 30 on the tops of which are spacing bushings 31 and nuts 32 to hold the foregoing described structure in assembly. This assembly, together with the additional parts hereinafter described, are enclosed by the cover casing 33, seating on the gasket 25, as shown in Fig. 1, which is bored to permit of the threaded rods 30 extending therethrough and is secured in place by nuts 34 co-operating with the rods 30.

Mounted upon the sill 28 upon the side shown in Fig. 4 is a spring switch blade 35 and co-operating contact point 36. The unsecured end of the switch blade 35 is provided with a knob or button 37 of sufficient length so as to cause the switch blade 35 to contact with the contact point 36 when the cover 33 is in position. Upon the top of the sill 28, opposite to the one just described, and as shown in Fig. 1, is mounted a coil 39 of conductor wire constituting a resistance, as hereinafter described, and on the bottom of this same sill 28 is provided a depending post 39 upon which or to which is secured a thermo-sensitive element 40 comprising laminations of metals of different expansive characteristics when subjected to heat. The unattached end of the thermo-sensitive element 40 is provided with a contact 41 which cooperates with a contact point 42 mounted opposite to contact 41 upon the sill 28. To protect this element from being accidentally disturbed or disorganized, I place a spacing washer 43 upon the thermo-sensitive element 40 immediately below the post 39 and a guard strap 44 upon the spacing washer 43, the post 39, thermo-sensitive element 40, spacing washer 43 and guard strap 44 being held in assembly by a screw 45. The opposite end of the guard strap 44 is held in position by screw 46 and spacer 47, the screw 46 screwing into the sill 28. The screw 45, heretofore mentioned, passes entirely through the sill 28 and on the top thereof is secured terminal straps 48 by means of a nut 49. The contact 42, likewise, passes through the sill 28 and to the top thereof is secured a terminal strap 50.

The end block 29 appearing upon the right hand side of Fig. 5 is provided with a pair of horizontally disposed and horizontally aligning inwardly projecting pins 51 which extend through perforations in a switch blade 52 so as to permit of a slightly rocking motion of the switch blade. Also extending from this same end block 29 between the pins 51 is a pin 53 which impinges against the face of the switch blade 52, which pin constitutes a pivotal or fulcrum point for the rocking of the blade. Vertically above the pins 51, the block 29 is provided with contact points 54 and opposite to these points 54 are complementary points 55 carried by the blade 52. A curved spring 56 secured to the bottom of block 29 extends around to contact the switch blade 52 centrally and above the pin 53 so as to maintain the points 54 and 55 normally in contact.

End block 29 appearing at the left in Fig. 5 differs from the construction just described only in omitting the pivot or fulcrum pin 53 and providing the pins 51a with shoulders upon which a switch blade 52a pivots instead of upon a pivot or fulcrum pin. The top central portions of the switch blades 52 and 52a are recessed, as at 57, to receive the shanks of a button headed linkage and operating element 58.

Fitting into the element 58 mediate its ends is the reduced end of a studlike projection 59 which is centrally bored, as at 60, to fit over the rod 22 actuated by the blade immersed in and subject to the movement of the liquid. The lower end of the stud 59 is tapered, as at 61, and just above the taper is provided with a circumferential groove 62.

Fitting about the rod 22 and secured thereto by set screw 63 is a collar 64, secured to the top of which is a lateral extension 65 of a U-shaped spring 66, shown most clearly in Fig. 8. The leg of the U-shaped spring 66 opposite to that having the lateral extension 65 is carried somewhat above the lateral extension and secured transversely thereof is a plate 67 provided with conical ended pins 68 which are proportioned to engage the switch blade 52 hereinbefore described upon its sides below the pivotal pin 53 so as to separate the contact points 54 and 55 when the element 58 and stud 59 are not in position, as shown in Fig. 7. To prevent such separation when element 58 and stud 59 are in position the upper end of the spring 66, to which the plate 67 is attached, is provided with a bow 69 which slides up over the conical end 61 and seats in the groove 62 when the stud 59 is assembled with the rod 22.

Figure 11:
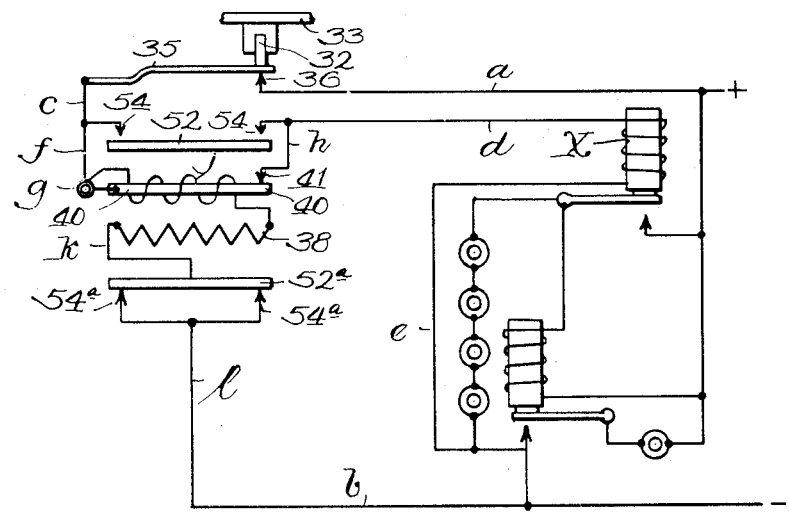
Figure 12:
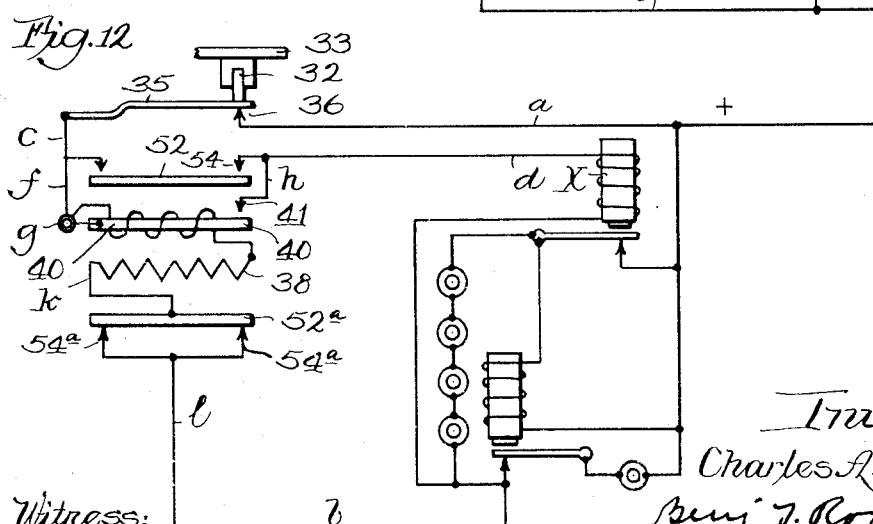

The wiring connecting the parts heretofore described and the progressive relation which the parts take in the transmission of a signal are illustrated in Figs. 10, 11, and 12. Fig. 10 shows the mechanism before the blade 14a and rod 22 have been displaced from their normal position by the movement of the liquid; Fig. 11 illustrates what occurs upon the initial displacement of blade 14a and rod 22; and Fig. 12 shows the condition after the displacement of blade 14a and rod 22 has persisted for a predetermined time and the signal is being transmitted. In each case the conductors from and to the source of supply of electrical energy are respectively designated a and b. Conductor c connects with contact point 36, which, when the cover 33 is in position, contacts with blade 35. From blade 35 conductor c runs to one of the contact points 54 carried by the end block 29, the current reaches the other contact point 54 through the switch blade 52, and from the other contact point 54 a conductor d runs to a relay X from whence leads a conductor e to the opposite side b of the service supply. In this condition the blade 75 of the relay X is maintained in position in which no signal impulse is transmitted through conductors d' and 76 to signal means 77 and thence through armature 78 and contact 79 to the conductor b. Conductor f branches from conductor c to a point g, corresponding with screw 45 and terminal straps 48 of Fig. 1. From point g one circuit branch flows through the thermo-sensitive element 40, contact points 41 and 42, and conductor h to conductor d which renders the thermo-sensitive element 40 parallel electrically with switch blade 52. This arrangement secures the energizing of the solenoid in the relay X until contact is destroyed and the circuit opened between the thermo-sensitive element 40 and contact point 42, after the circuit has been opened at either of contact points 54 by the movement of the switch blade 52. From point g another branch conductor j winds about the thermo-sensitive element 40 and connects with one end of the coil 38. The other end of the coil 38 is connected by conductor k with the switch blade 52a, and when switch blade 52a contacts with either or both of the contact points 54a the circuit is closed through conductor l leading from contact points 54a to supply conductor b.

The reasons for employing the opposing linked switch blades 52 and 52a instead of a single switch blade are two: First, such an arrangement permits of use in closed circuit work without any draw of current through the elements 38 and 40 until the apparatus is required to function, and second, the switch blade 52 secures the restoration of the system immediately upon the removal of the actuating influence and without the cooling of the element 40.

This immediate reenergization of relay X and restoration of the system upon closure of the circuit through contact 54 and switch blade 52 immediately upon cessation of flow and without waiting for cooling of the element 40 is highly desirable. Systems such as described are periodically tested by an inspector allowing a certain flow through the line, checking the time delay setting of the switch and ascertaining whether the alarm circuit is in proper working order. If the system is installed in a large manufacturing or mercantile establishment, or in public buildings having numerous occupants, the alarm circuit will usually include a number of alarm devices. The ringing of these alarm devices for any considerable period of time will not only serve as a distraction to the occupants, but will result in their ceasing their work and leaving the building under the apprehension that an actual fire has occurred. Employees of such establishments, school children and the like, have usually been instructed to leave the building upon hearing such alarm. Also, if the alarm were allowed to continue, in many cases of actual fire the occupants of the building would not leave their work, thinking it was merely a test of the system. For these reasons it is essential that immediate opening of the alarm circuit during tests of the system be provided.

It will be observed from the diagrams and the foregoing explanation that if contact between switch blade 52 and either contact point 54 is interrupted, the circuit including switch blade 52 will be opened. It will also be observed that it will be necessary to separate switch blade 52a from both of the contact points 54a in order to open the circuit including switch blade 52a. This is desirable in my present apparatus as I desire to secure an arrangement which will be positive and sensitive to secure the opening of the circuit by means of the movement of switch blade 52 and will be equally positive in closing the circuit through the movement of switch blade 52a.

In order to further insure the closing of the circuit including switch blade 52a immediately before the opening of the circuit including switch blade 52, the link 58 is so proportioned that a slight play is permitted between the end of the link engaging switch blade 52 and switch blade 52a so that switch blade 52a is released and permitted to close before switch blade 52 is actuated to open the circuit in which it is included.

Upon the movement of the blade 14a and rod 22 the link 58 between switch blades 52 and 52a shifts to open the circuit including the switch blade 52 at either or both of contact points 54 and to close the circuit including switch blade 52a at either or both of the contact points 54a. This condition is shown in Fig. 11. Upon the closing of the circuit including switch blade 52a current proceeds through conductor j and heats the thermo-sensitive element 40, thereby causing it to flex and break contact at contact point 41. The amount of time required in heating the thermo-sensitive element 40 so that it will break contact at contact point 42 may be predetermined and controlled in several ways; one, by the amount of winding of conductor j around the thermo-sensitive element 40; another, the size of the resistance 38; another, the size of the laminations of the thermo-sensitive element 40; and still another, means for controlling the time of functioning of the thermo-sensitive element 40 is through the adjustment of the contact points 41 and 42.

It has been my experience that surges and vibrations in a system of piping for the storage and conduction of liquids do not produce unidirectional movement in the liquid for a period as great as thirty seconds so that if the thermo-sensitive element is conditioned to operate within thirty seconds after the closing of the circuit including conductor j, the apparatus will be free from indicating mere surges or vibrations of the liquid in the system.

We will assume that a flow has been started in the system which has persisted longer than thirty seconds. The circuit including switch blade 52 is opened, the circuit including thermo-sensitive element 40 is also opened and current ceases through conductor d. The relay X is de-energized, the blade 75 of the relay falls into engagement with contact 80. This short circuits relay 82 through conductor 83 and at the same time energizes suitable devices 84 connected across to conductor b. The deenergization of relay 82 causes armature 78 to engage contact 79, thereby energizing the signal 77. This condition is shown in Fig. 12.

It will further appear that the entire system being energized through contact point 36 and blade 35 relay X will likewise be de-energized by removal of the cover casing 33.

It also appears that if link 58 and stud 59 are removed during inspection, bow 69 will be released and spring 66 operating through pins 68 will break circuit between switch blade 52 and contact points 54, and this condition will persist until link 58 is again put in position, which mere act of assembly causes the withdrawal of the bow 69 and pins 68, thereby permitting the circuit including switch blade 52 and contact points 54 to again close.

Having described my invention what I claim as new and desire to secure by Letters Patent is:

1. In a flow indicating circuit including a flow responsive device, a control circuit connected to a source of current and including a pair of line conductors, a relay having one terminal connected directly to one line conductor, a pair of conjointly operable switches actuated by said flow responsive device for the duration of flow, one of said switches being normally closed and having one contact connected to the other of said line conductors and the other contact connected to the other terminal of said relay for normally maintaining said relay energized, the other of said switches being normally open and having one contact connected to said one line conductor, a shunt for said normally closed switch, heat responsive means for opening said shunt, a heating coil connected between said other of said line conductors and the other contact of said normally open switch, and a signal circuit operable upon de-energization of said relay whereby actuation of said flow responsive device simultaneously opens said normally closed switch and closes said normally open switch to energize said heating coil for actuating said heat responsive means to open said shunt and thereby deenergize said relay, and whereby said relay is immediately reenergized upon cessation of flow by closure of said normally closed switch independently of said shunt.

2. In a flow indicating circuit, a pair of line conductors connected to a source of current, a relay having one terminal connected to one of said conductors, a normally closed switch connecting the other terminal of said relay to the other of said conductors to maintain said relay energized, a signal circuit operable upon deenergization of said relay, a normally closed shunt switch connected between said other of said conductors and said other terminal of said relay, thermally responsive means for opening said shunt switch, electrical heating means therefor, a flow responsive device, and means actuated by said device during flow for simultaneously opening said normally closed switch and energizing said heating means whereby said heating means after a predetermined interval actuates said thermally responsive means to open said shunt switch to deenergize said relay, and whereby said relay is immediately reenergized upon closure of said normally closed switch due to cessation of flow.

3. A flow indicating circuit including a pair of line conductors connected to a source of current, a normally energized relay having one terminal connected to one of said conductors, a normally closed switch between said other conductor and the other terminal of said relay, a normally closed shunt for said switch, thermally responsive means controlling opening and closing of said shunt, a heating coil connected at one end to said other of said conductors, a normally open switch connected between said one of said conductors and the opposite end of said heating coil, a flow responsive device, means actuated by said device for conjointly opening said normally closed switch and closing said normally open switch for the duration of flow whereby closure of said last named switch energizes said heating coil to actuate said thermally responsive means for opening said shunt, and a signal circuit actuated by deenergization of said relay upon opening of said shunt.

CHARLES A. TURNER.